United States Patent [19]
Heatwole

[11] Patent Number: 6,029,696
[45] Date of Patent: Feb. 29, 2000

[54] AIR BLEED DEVICE

[75] Inventor: Gregory L. Heatwole, Fort Wayne, Ind.

[73] Assignee: Dana Corporation, Toledo, Ohio

[21] Appl. No.: 09/138,622

[22] Filed: Aug. 24, 1998

[51] Int. Cl.[7] .................................................. F16K 24/04
[52] U.S. Cl. ........................ 137/587; 220/374; 74/606 R
[58] Field of Search .................................. 137/583, 587,
137/590; 454/237, 241, 250, 254, 270,
271, 275; 220/373, 374; 74/606 R

[56] References Cited

U.S. PATENT DOCUMENTS

| | | | |
|---|---|---|---|
| 2,644,609 | 7/1953 | Foss . | |
| 3,454,182 | 7/1969 | Morton . | |
| 3,686,973 | 8/1972 | Davison, Jr. et al. | 74/606 R |
| 3,866,789 | 2/1975 | Lambert . | |
| 3,916,724 | 11/1975 | Muller et al. | 74/606 R |
| 3,983,891 | 10/1976 | Shoemaker | 137/587 X |
| 4,351,203 | 9/1982 | Fukunaga | 74/606 R |
| 4,506,562 | 3/1985 | Yamaura . | |
| 4,554,844 | 11/1985 | Hamano | 74/606 R |
| 4,706,840 | 11/1987 | Thompson | 220/373 |
| 4,825,905 | 5/1989 | Whitley II | 137/587 |
| 4,877,152 | 10/1989 | Whitley II | 220/374 |
| 4,960,153 | 10/1990 | Bergsma | 137/587 |
| 4,966,189 | 10/1990 | Harris | 137/587 |
| 5,083,583 | 1/1992 | Benjey | 137/587 |
| 5,088,947 | 2/1992 | Whitley II et al. | 220/374 X |
| 5,195,807 | 3/1993 | Lederman | 301/108.1 |
| 5,273,466 | 12/1993 | Thompson | 137/587 X |
| 5,509,949 | 4/1996 | Gluys et al. | 74/606 R X |
| 5,538,330 | 7/1996 | Ehrlich | 301/124.1 |

*Primary Examiner*—John Rivell
*Attorney, Agent, or Firm*—Oldham & Oldham Co., L.P.A.

[57] ABSTRACT

An air bleed device for a rigid closed housing having a vent hole in a vehicle power transmission system has a baffle portion and a vent portion, connected through a neck portion. In use, the baffle portion is positioned inside the housing and is significantly larger than the vent hole, so it may not be deformed sufficiently to pass through the vent hole. The baffle portion is a pair of planar pieces held in spaced apart relationship by a wall portion which runs along the periphery of the planar pieces and leaves an opening to give access to a plenum between the planar pieces. An outer surface of one of the planar pieces rests against the inner wall of the housing. The vent portion has a collar with a decreasing diameter which may be pulled through the vent hole in a deformed manner and a lower flange-like surface of the collar rests against the outer wall of the housing. When installed in the vent hole, the neck portion provides a frictional fit due to its outside diameter. Internal passages in the baffle portion, the neck portion and the vent portion are interconnected to allow free air flow from the housing interior to the ambient The preferred air bleed device is a unitary piece molded from an oil-resistant elastomer.

12 Claims, 1 Drawing Sheet

AIR BLEED DEVICE

The present invention relates to an air bleed device for an enclosed housing, particularly in a vehicle. Particularly, applications of the present invention are found in the axle, differential and transmission housings.

BACKGROUND OF THE INVENTION

Transmitting power in a vehicle generates a great amount of heat within a generally enclosed and rigid housing. The substantially hollow interiors of these housings, which include axles, transmissions and differentials, contain lubricants and air. The lubricants do not expand or contract to any appreciable extent due to the temperature changes, but the air present in the housing reacts much more strongly to the differences. Since the walls of the housing are rigid, pressure differences between the interior and exterior of the housing can put undue stress on gaskets and other sealing devices which are used with adjoining pieces of the housing if pressure differences cannot be relieved. To prevent failure of these sealing devices, accompanied by loss of lubricant and possible introduction of contaminants into the housing, it is desirable and known to communicate the interior of the housing with the exterior. As heat is generated, excess pressure in the housing may be vented to the exterior and, upon cooling, makeup air may be drawn into the housing. Such an air bleed device needs to selectively allow passage of air rather than lubricant.

While air bleed devices are known for vehicle power transmission housings, there is clearly room for improvements in terms of simplicity, compactness, and various structures which protect the vent from damage and from outside contaminants.

SUMMARY OF THE INVENTION

It is therefore a primary advantage of the present invention to provide an inexpensive air bleed device which reliably and selectively equilibrates the air pressure in the housing interior separated from the ambient by a housing wall having a vent hole therethrough. This advantage is achieved by an air bleed device comprising a baffle portion, a vent portion and a neck portion. The baffle portion has first and second planar parts, held in spaced-apart relationship to provide an internal plenum. The plenum has an opening provided along the spacing between the planar parts and allows access to and from the housing interior. The baffle portion is significantly larger than the vent hole. The vent portion comprises a collar having a decreasing outside diameter from a first end of the vent portion toward a second end. The vent portion has an internal passage communicating its ends. The neck portion also has first and second ends and an internal passage communicating those ends. The neck portion having an outside diameter slightly larger than the vent hole diameter and a height slightly less than the thickness of the housing wall. The first end of the neck portion is attached to the baffle portion at an outer surface of the first planar part and the second end is to the first end of the vent portion. The neck portion is attached such that the internal passages in the various potions define a connecting passage which communicates the opening in the baffle portion to the ambient at the second end of the vent portion.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PREFERRED EMBODIMENT

Figure 1:
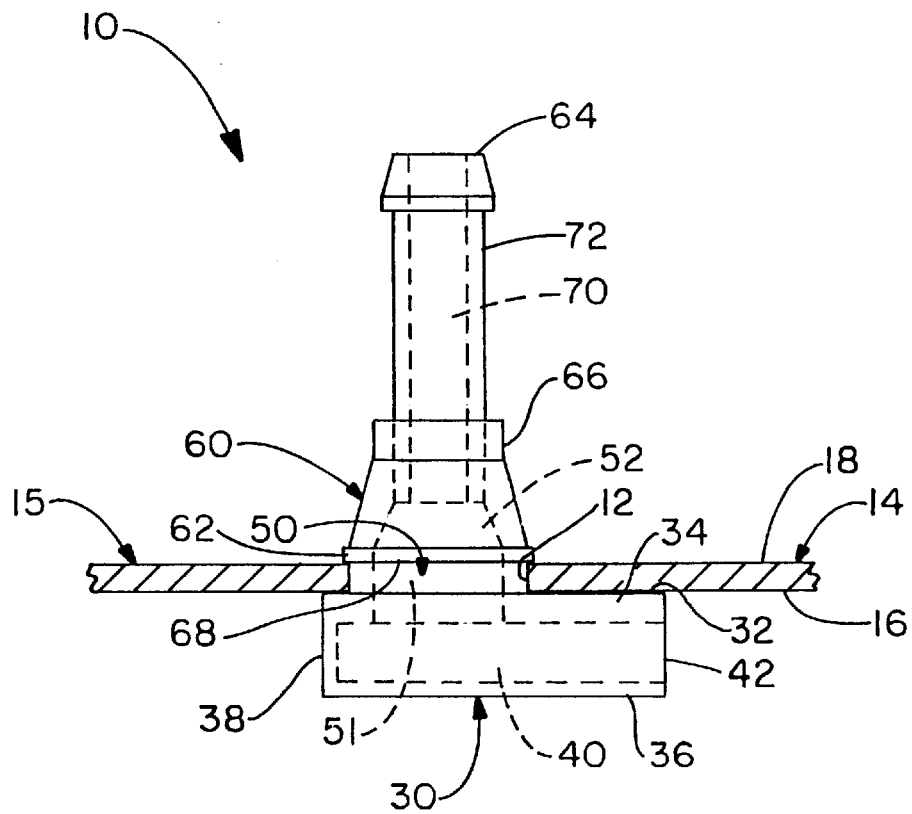
FIG. 1 is a sectional elevation view of the air bleed device of the present invention installed in a rigid housing.

FIG. 1 shows the air bleed device 10 of the present invention inserted in a vent hole 12 provided in a generally rigid wall 14 of a generally closed housing 15 in a vehicle. The wall 14 has a generally smooth and flat inner surface 16, which may have some arcuate nature, although if such an arcuate surface is presented, it will tend to have a radius of curvature that is large compared to the dimensions of the air bleed device 10. The flat or gently arcuate portion of inner surface 16 has an area which is large compared to the area of vent hole 12. In a similar fashion, the wall 14 has a smooth and generally flat outer surface 18 surrounding the vent hole 12 which opposes the inner surface 16 and is separated from it by a generally uniform thickness.

Although the air bleed device 10 is preferably formed into a single piece, as will be explained in more detail below, it will be recognized as comprising several distinct portions. The first such piece is a baffle portion 30 and the second such piece is a vent portion 60, with the baffle portion and vent portion being joined together through a neck portion 50. Running through the baffle portion 20, the neck portion 50 and the vent portion 30 is a connecting passage 52, which allows air flow from the interior to the exterior of the housing and vice versa.

The neck portion 50 is particularly sized to provide a frictional fit in vent hole 12. The outside diameter of the generally cylindrical neck portion 50 is large enough to allow the resilient elastomeric nature of the material of which it is comprised to expand and fill the vent hole 12 in a frictional fit while still permitting a portion 51 of the connecting passage 52 in the neck portion to be freely open to air flow. The neck portion 50 also has a height which is approximately equal to the thickness of the wall 14 at vent hole 12.

The neck portion 50 extends outwardly from the baffle portion 30 and particularly from a planar first outer surface 32 thereof. In the preferred embodiment, the neck portion 50 is normal to this first outer surface 32 and is generally situated away from the edges of the baffle portion, although it is not necessarily centrally positioned.

Figure 2:
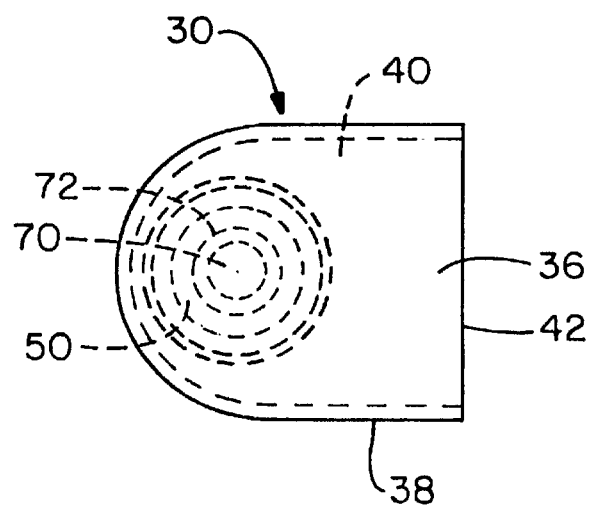
FIG. 2 is an isolated bottom plan view of the air bleed device.

In addition to the side view of the device 10 provided by FIG. 1, a bottom plan view of the device is given in FIG. 2 and further aspects of the device are disclosed. Baffle portion 30 is a somewhat slab-like body comprising a first planar piece 34, of which the first outer surface 32 forms a part, a second planar piece 36 and at least one wall portion 38. The at least one wall portion 38 runs along the periphery of the first and second planar pieces 34, 36 and separates them from each other, leaving a plenum 40 therebetween. This plenum 40 is an integral part of the connecting passage 52. The at least one wall portion 38 does not run along the entire periphery, leaving at least one opening 42 to communicate the exterior of the baffle portion 30 with the plenum 40. In the preferred embodiments, first and second planar pieces 34, 36 are substantially the same, the only significant difference being the affixation of the neck portion 50 to the first planar piece. In the embodiment shown, and best seen in FIG. 2, the baffle portion is generally rectangular when viewed normal to the planar pieces 34, 36, with one end of each of the planar pieces being rounded off. In such an embodiment, which is clearly preferred, the area of the planar piece, when viewed normally, is at least 5 times the area of the vent hole 12 through which the air bleed device 10 will be used. The large area of the planar pieces 34, 36, relative to the vent hole 12 is very useful in retaining the device 10 in the vent hole 12, and it effectively precludes the baffle portion 30 from being pulled out of the housing through vent hole 12. As FIG. 2 shows, the preferred location for the at least one opening 42 is at the rectangular end of baffle portion 30.

Referring back to FIG. 1, the vent portion 60 of the device 10 is now described. In the embodiment shown, the vent portion 60 begins with an first end 62 proximal to the neck portion 50 and terminates in a distal or second end 64. In the preferred embodiment shown, the proximal end 62 features a frustoconical collar 66 with the collar decreasing in diameter as one moves distally away from an abrupt change in diameter at the proximal end of the collar. In some embodiments, this diameter change may be even greater than shown in FIG. 1, but in any case, it is important that the vent portion be flexible enough and small enough that it may be drawn through the vent hole 12 from the inside of the housing. A flange-like lower surface 68 defined by the abrupt diameter change at the proximal or first end of the collar 66 serves to effectively hold the device 10 in the vent hole 12. In fact, in one embodiment, if the neck portion 50 has a height slightly less than the thickness of wall 14, the device 10 will be firmly seated both horizontally and vertically in hole 12. It will be seen that the height of neck portion 50 is defined by the distance between the first outer surface 32 of the baffle portion 30 and the lower surface 68 of the vent portion 60. Vent portion 60 has an internal passage 70 which communicates to connecting passage 52 of the neck portion and opens to the exterior at the distal end 64 of the vent portion.

In a minimalist embodiment of the invention, the vent portion 60 could terminate at the distal end of the collar 66. In such a case, it is possible to insert a rigid tube, perhaps even a rigid metal tube into the distal end of the collar, increasing the length of the vent portion, although this would not be essential to operability of the device 10. However, in the preferred embodiments as particularly shown in FIG. 1, the device 10 will be molded from an elastomeric material with a cylindrical portion 72 extending beyond the distal end of the collar 66. FIG. 1 shows a second collar 74 formed at the distal end 64 of the vent portion 60. The preferred vent portion 60 is shown as extending straight outwardly from the vent hole, but it is possible to provide a vent portion which has an angularity imposed on it, particularly in the cylindrical portion.

In relieving pressure in the closed housing, it is important that the air bleed device 10 allow free flow of air in and out, depending upon pressure, while retaining lubricant in the housing. The air bleed device 10 of the present invention achieves this purpose by providing an integral baffle 30 around the vent hole 12. Since the device 10 and particularly the baffle are formed from an elastomeric material, there is an inclination to compare the device to an inflation valve or the like, as would be known for maintaining inflation air in a ball or the like. However, inflation valve devices have a purpose to actually prevent the free exchange of air, so they are not really applicable. The baffle 30 taught in the present invention must possess a certain amount of rigidity so that the second planar piece 36 is not pressed against the first planar piece 34, especially at the connecting passage 52, as this would prevent the outflow of air during a time when the pressure in the housing would be higher than the ambient.

The device 10 also will be in contact with lubricant, typically a petroleum-based lubricating oil. For these reasons, the device 10 of the present invention should be resistant to swelling or other reaction to petroleum-based lubricants and should have a Shore durometer hardness in excess in 80. The rigidity needed in the baffle portion 30 will, in some cases, affect the diameter of the lower surface 68 of the vent portion 68, since the vent portion and particularly the collar 66 must be able to be deformed to fit through vent hole 12 from the inside of the housing. There are a number of synthetic rubber materials which are commercially available and which will immediately be known one of skill in this art.

Some of the known prior art devices intended to achieve the same purpose as the present invention use a steel vent pipe which would be welded into the vent hole and a steel baffle plate which would be welded around the inside portion of the vent hole. The present invention allows a unitary bleed device 10 to be installed by pulling in through the vent hole 12 until the first outer surface 32 of the baffle portion is against the inner surface 16 of the housing wall. By directing the opening 42 in the baffle portion 30 inside the housing, lubricant may be effectively diverted. This allows the housing interior to "breathe" by separating the air from the gear lube.

The present invention also facilitates the installation process. The prior art welding procedures are much more time consuming than the simple "pull through" installation of the present device. As noted previously, the large size of the baffle portion 30 relative to the size of the vent hole 12 absolutely precludes insertion from the outside, and also prevents removal from the outside.

Another problem of the prior art is solved by the present invention. When a rigid metal tube is welded into the vent hole, the somewhat fragile nature of the outwardly extending tube causes difficulty in efficiently nesting the housings for shipment, since the tubes must be protected. The flexible, non-welded vent portion of the present invention does not require this protection.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An air bleed device for communicating an interior of a generally closed housing in a vehicle with the exterior through a vent hole in a wall of the housing, the device comprising:

a baffle portion with a first and a second planar part in spaced-apart relationship to provide an internal plenum having a opening into the housing interior, the baffle portion being significantly larger than the vent hole;

a vent portion comprising a collar with a decreasing outside diameter from a first end thereof to a second end thereof and having an internal passage therethrough communicating the first end and the second end; and a neck portion having first and second ends and an internal passage therethrough, the neck portion having an outside diameter slightly larger than the vent hole diameter and a height slightly less than the thickness of the housing wall;

wherein the neck portion has the first end thereof attached to an outer surface of the first planar part of the baffle portion and the second end thereof attached to the first end of the vent portion such that the internal passages in the portions define a connecting passage communicating the opening in the baffle portion to the second end of the vent portion.

2. The air bleed device of claim 1 wherein the device is molded in a single piece.

3. The air bleed device of claim 2 wherein the device is molded from a resilient elastomeric material.

4. The air bleed device of claim 3 wherein the resilient elastomeric material is oil resistant.

5. The air bleed device of claim 3 wherein the resilient elastomeric material has a Shore durometer hardness of at least 80.

6. The air bleed device of claim 1 wherein the outer surface of the first planar part bears upon an inner surface of the housing when the device is inserted in the vent hole.

7. The air bleed device of claim 6 wherein the outer surface has an area which is at least five times the area of the vent hole.

8. The air bleed device of claim 1 wherein the vent portion has a radially extending flange-like lower surface at the first end thereof.

9. The air bleed device of claim 8 wherein the lower surface bears upon an outer surface of the housing when the device is inserted in the vent hole.

10. The air bleed device of claim 1 wherein the vent portion further comprises a cylindrical portion extending outwardly from the collar.

11. The air bleed device of claim 1 wherein the baffle portion is too large to be pulled in a deformed manner through the vent hole but the vent portion may be pulled through the vent hole in a deformed manner.

12. The air bleed device of claim 1 wherein the first and second planar parts of the baffle portion are held in a spaced apart relationship by at least one wall portion along a periphery of the first and second planar parts, with the opening to the plenum provided by an absence of the wall portion along the periphery.

* * * * *